United States Patent
Tang et al.

(10) Patent No.: US 9,508,364 B1
(45) Date of Patent: Nov. 29, 2016

(54) PERPENDICULAR MAGNETIC RECORDING (PMR) WRITER WITH HYBRID SHIELD LAYERS

(71) Applicant: Headway Technologies, Inc., Milpitas, CA (US)

(72) Inventors: Yuhui Tang, Milpitas, CA (US); Yaguang Wei, Pleasanton, CA (US); Jiun-Ting Lee, Sunnyvale, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 14/848,391

(22) Filed: Sep. 9, 2015

(51) Int. Cl.
*G11B 5/187* (2006.01)
*G11B 5/11* (2006.01)
*G11B 5/31* (2006.01)

(52) U.S. Cl.
CPC ............. *G11B 5/187* (2013.01); *G11B 5/112* (2013.01); *G11B 5/3116* (2013.01); *G11B 5/315* (2013.01); *G11B 5/3143* (2013.01)

(58) Field of Classification Search
None
See application file for complete search history.

(56) References Cited

U.S. PATENT DOCUMENTS

| | | | |
|---|---|---|---|
| 8,284,516 B1 | 10/2012 | Tang et al. | |
| 8,427,781 B1 | 4/2013 | Sasaki et al. | |
| 8,470,186 B2 * | 6/2013 | Chen | G11B 5/1278 216/22 |
| 8,498,079 B1 * | 7/2013 | Song | G11B 5/1278 360/125.3 |
| 8,582,238 B1 | 11/2013 | Liu et al. | |
| 8,724,259 B1 * | 5/2014 | Liu | G11B 5/1278 360/125.15 |
| 8,749,919 B2 | 6/2014 | Sasaki et al. | |
| 8,879,208 B1 | 11/2014 | Liu et al. | |
| 2007/0171575 A1 | 7/2007 | Lim et al. | |
| 2009/0141406 A1 * | 6/2009 | Sasaki | G11B 5/112 360/319 |
| 2013/0027809 A1 | 1/2013 | Min et al. | |
| 2013/0335847 A1 | 12/2013 | Shiroishi | |

OTHER PUBLICATIONS

Effect of 3d, 4d, and 5d transition metal doping on damping in permalloy thin films, by J. O. Rantschler et al., Journal of Applied Physics 101, 033911, Feb. 14, 2007, pp. 1-5.
"Magnetic Damping in Ferromagnetic Thin Films," by Mikihiko Oogane et al., Japanese Journal of Applied Physics, vol. 45, No. 5A, May 2006, pp. 3889-3891.
Co-pending, U.S. Appl. No. 14/690,693, filed Apr. 20, 2015, "High Moment Side Shield Design for Area Density Improvement of Perpendicular Magnetic Recording (PMR) Writer," by Yue Liu et al., 54 pgs.
Co-pending, U.S. Appl. No. 14/847,418, filed Sep. 8, 2015, "Perpendicular Magnetic Recording (PMR) Write Shield Design With Minimized Wide Adjacent Track Erasure (WATE)", by Yuhui Tang et al., 42 pgs.

* cited by examiner

*Primary Examiner* — Carlos E Garcia
(74) *Attorney, Agent, or Firm* — Saile Ackerman LLC; Stephen B. Ackerman

(57) ABSTRACT

A PMR writer is disclosed with an all wrap around (AWA) shield design in which one or more of the leading shield, trailing shield, and side shields are comprised of a composite wherein a magnetic "hot seed" layer made of a >19 kG to 24 kG material adjoins a gap layer, and a side of the hot seed layer opposite the gap layer adjoins a high damping magnetic layer made of a 10-16 kG material (or a 16-19 kG material in the trailing shield) having a Gilbert damping parameter $\alpha > 0.04$. In a preferred embodiment, the high damping magnetic layer is FeNiRe with a Re content of 3 to 15 atomic %. One or both of the main pole leading and trailing sides may be tapered. Side shields may have a single taper or dual taper structure. Higher writer speed with greater areal density capability is achieved.

12 Claims, 11 Drawing Sheets

PERPENDICULAR MAGNETIC RECORDING (PMR) WRITER WITH HYBRID SHIELD LAYERS

RELATED PATENT APPLICATIONS

This application is related to the following: U.S. Pat. No. 8,427,781; U.S. Pat. No. 8,749,919; U.S. application Ser. No. 14/690,693, filed on Apr. 20, 2015; and, Ser. No. 14/847,418, filing date Sep. 8, 2015; all assigned to a common assignee and herein incorporated by reference in their entirety.

TECHNICAL FIELD

The present disclosure relates to a hybrid shield structure in a PMR write head wherein one or more of a trailing shield, side shield, and leading shield are a composite with a high moment (>19 kG to 24 kG) layer having a side facing the main pole and contacting a gap layer, and an opposite side that adjoins a shield layer made of a high damping material in order to enhance the return field and the speed of the writer while improving areal density capability (ADC) for both conventional and shingle magnetic recording applications.

BACKGROUND

Perpendicular magnetic recording has been developed in part to achieve higher recording density than is realized with longitudinal recording devices. A PMR write head typically has a main pole layer with a small surface area at an ABS, and coils that conduct a current and generate a magnetic flux in the main pole such that the magnetic flux exits through a write pole tip and enters a magnetic medium (disk) adjacent to the ABS. Magnetic flux is used to write a selected number of bits in the magnetic medium and typically returns to the main pole through two pathways including a trailing loop and a leading loop in a shield structure. The trailing loop comprises a trailing shield structure with first and second trailing shield sides at the ABS. The second (PP3) trailing shield arches over the write coils and connects to a top surface of the main pole above a back gap magnetic connection. The first trailing shield has a high moment (>19 kG to 24 kG) layer called a hot seed layer that adjoins a top surface of the write gap. A good hot seed response is required to reduce stray fields in the side shields and leading shield, and provide a better down-track field gradient. The leading loop includes a leading shield with a side at the ABS and that is connected to a return path proximate to the ABS. The return path extends to the back gap connection and enables magnetic flux in the leading loop pathway to return from the leading shield at the ABS and through the back gap connection to the main pole. A PMR head which combines the features of a single pole writer and a double layered medium (magnetic disk) has a great advantage over LMR in providing higher write field, better read back signal, and potentially much higher areal density.

For both conventional (CMR) and shingle (SMR) magnetic recording, continuous improvement in storage area density is required for a PMR writer. A write head that can deliver or pack higher bits per inch (BPI) and higher tracks per inch (TPI) is essential to the area density improvement. A fully wrapped around shield design for a PMR write head is desired where the trailing shield is responsible for improving down track field gradient while side shields and a leading shield improve the cross track field gradient and TPI as well as adjacent track erasure (ATE) performance. To avoid wide adjacent track erasure (WATE), all shields preferably are made of a<19 kG material. A double write shield (DWS) design may be employed wherein the main pole and hot seed in the first trailing shield are comprised of high moment (>19 kG to 24 kG) material while the leading shield and side shields are made of low moment 10-16 kG material, and the trailing shield structure is made of 16-19 kG material. If writeability can be sustained, a thinner write gap at the main pole trailing (top) surface and a narrower side gap adjoining the main pole sides in the cross-track direction are preferred for better track field gradient (Hy_grad, BPI) and cross-track field gradient (Hy_grad_x, TPI), respectively. To enhance writeability, side shield height reduction is important not only to reduce main pole flux shunting to the side shields, but also to allow more main pole volume closer to the ABS. However, side shield saturation may degrade Hy_grad_x and TPI capability, and is a concern with advanced side shield structures with a height of about 0.3 microns or less.

The key to an optimized PMR writer structure is the capability to control distribution of magnetic flux from the main pole to each shield. Ideally, better control of magnetic flux in the near field or proximate to the main pole is desirable to achieve an enhanced near field gradient and to realize higher ADC. Typically, flux distribution is controlled by changing the magnetic saturation (Ms) of materials in the shields, and by modifying geometries (size and shape) of the shields. However, additional methods of tuning magnetic flux distribution are needed to provide better control and flexibility to enable PMR writers with higher TPI capability to at least 400K/in for CMR and at least 500K/in for SMR.

SUMMARY

One objective of the present disclosure is to provide an all wrap around (AWA) shield design for a PMR writer that enables a means of controlling magnetic flux distribution from the main pole to the shields.

Another objective of the present disclosure is to provide a method of distributing magnetic flux from main pole to shields according the first objective that is also compatible with <19 kG materials in the shields and current geometries of shields.

Yet another objective of the present disclosure is to provide a fabrication method for an AWA shield structure that satisfies the first two objectives.

According to a first embodiment, these objectives are achieved with a PMR writer shield configuration with an AWA design wherein one or more, and preferably all of a leading shield, side shields, and trailing shield are composites having a high Ms (>19 to 24 kG) magnetic layer with a main pole facing side that adjoins a leading gap, side gap, and write gap, respectively, and a second layer made of a 10-19 kG magnetic material with a high Gilbert damping (HD) parameter a preferably >0.04 that adjoins a side opposite to the main pole facing side of the high Ms layer. The value a is related to the Gilbert damping constant G according the equation $G=ayMs$ where a is the damping parameter, y is the gyromagnetic ratio, and Ms is the magnetic saturation value. At least in the trailing shield, a third magnetic layer made of a 10-19 kG material contacts the side of the high damping magnetic layer that faces away from the main pole. Optionally, the side shields and leading shield are entirely made of a HD magnetic layer. According to one embodiment, the high damping magnetic layer is FeNiRe with a Re content between 3 and 15 atomic %. However, other alloys including but not limited to FeCoRe, FeCoNiRe, FeNiM, FeCoM, and FeCoNiM where M is one of Os, Ir, Rh, Ti, Ta, V, Cr, W, Mn, Mo, Cu, Zr, Nb, Hf, Ru, Pd, Pt, Ag, and Au may also be employed as the high damping magnetic layer.

In one embodiment, the main pole has tapered leading side that extends from the ABS to a first corner where the tapered leading side intersects with a main pole leading side formed orthogonal to the ABS. Likewise, the main pole may have a tapered trailing side that extends from the ABS to a second corner where the tapered trailing side intersects with a main pole trailing side formed orthogonal to the ABS. Main pole facing surfaces of the leading shield layers may be formed substantially parallel to the main pole tapered leading side and each leading shield layer has a back side formed along a plane that is a first height from the ABS where the first height may be a greater distance from the ABS than the first corner. Similarly, main pole facing surfaces of the composite trailing shield may be formed substantially parallel to the main pole tapered trailing side, and each trailing shield layer has a back side formed along a second plane that is second height from the ABS where the second height is a greater distance from the ABS than the second corner.

From an ABS view, the main pole may have a trapezoidal shape wherein a trailing side has a track width (TW) that is greater than a cross-track width of the leading side. Moreover, each of the side shield layers may have a main pole facing side that adjoins a side gap layer and is essentially parallel to the nearest main pole side. The high Ms layer adjoining each side gap has a cross-track width of 20 to 70 nm while the high damping constant magnetic layer has a cross-track width of at least 30 nm on each side of the main pole. In some embodiments, the hot seed layer in the trailing shield, and the write gap have a cross-track width substantially equivalent to a cross-track width between corners of the side shield high damping magnetic layers along a plane that includes the main pole trailing side and top surfaces of the side gaps and high Ms side shield layers. Furthermore, the high damping constant magnetic layer in the trailing shield may have two sections wherein a first section has a first thickness and contacts a top surface of the write gap, and a second section is formed along each hot seed layer sidewall and has a second thickness greater than the first thickness.

From a top-down perspective, each of the side shield layers has a main pole facing side that is parallel to at least a section of the nearest main pole side, has a taper angle α1 with respect to a plane that bisects the main pole, and has a back side at a third height from the ABS. In another embodiment, each side shield may have a double taper design comprised of a plurality of sides facing the main pole.

In other embodiments, one or both of the composite leading shield and composite trailing shield may have a second portion that adjoins the back side of a first portion at the first height and second height, respectively, and has a main pole facing side that is formed along a plane which is orthogonal to the ABS.

A method for forming the AWA shield structure wherein each of the leading shield, side shields, and trailing shield include a high Ms layer adjoining a gap layer, and a high damping magnetic layer described previously is provided. An opening is formed between two side shields that exposes a portion of a 10-19 kG layer at the leading shield top surface. Thereafter, a high damping magnetic layer, high Ms layer, and gap layer are sequentially and conformally deposited on the sidewalls and bottom surface of the opening. Next, the main pole layer is plated to fill the opening, and a chemical mechanical polish process is performed to form a planar top surface of the main pole, side gap, and the composite side shields including the high Ms and high damping magnetic layers. The write gap and high Ms trailing shield layer are sequentially formed on the top surface of the main pole, side gaps, high Ms side shield layer, and high damping magnetic side shield layer. Thereafter, the high damping layer in the trailing shield is formed along the sidewalls and top surface of the high Ms trailing shield layer by a plating or sputter deposition process. Finally, an uppermost layer in the first trailing shield is formed on the high damping trailing shield layer. Conventional processes to form a second trailing shield (PP3) layer and overlying layers on the composite first trailing shield are then performed.

BRIEF DESCRIPTION OF THE DRAWINGS

FIGS. 8a-14a are ABS views showing a sequence of steps where an AWA shield structure is formed around a main pole layer in a PMR writer according to an embodiment of the present disclosure.

DETAILED DESCRIPTION

Figure 1:
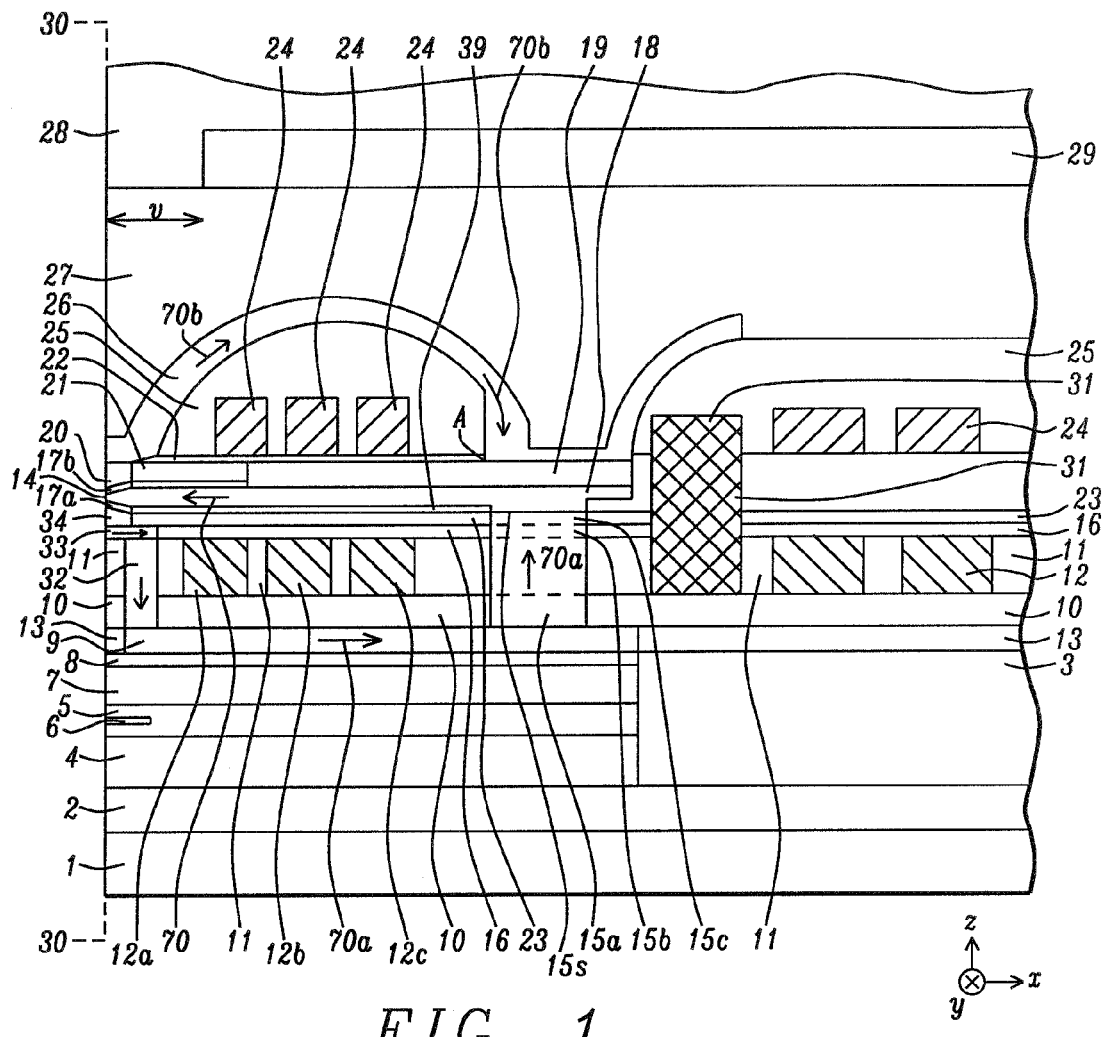
FIG. 1 is a down-track cross-sectional view showing a PMR writer having a double write shield (DWS) design with two flux return pathways to the main pole.

The present disclosure takes advantage of a high damping magnetic layer made of a 10-19 kG material and with a Gilbert damping parameter >0.04 in one or more of a leading shield, side shields, and trailing shield in order to improve shield response for enhanced ADC. The exemplary embodiments depict a main pole with a tapered leading side and tapered trailing side. However, the present disclosure also anticipates that one or both of the main pole leading side and trailing side are not tapered but are formed along a plane that is orthogonal to the ABS. In the drawings, the y-axis is a cross-track direction, the z-axis is a down-track direction, and the x-axis is in a direction orthogonal to the ABS and towards a back end of the PMR writer. It should be understood that the composite shield design described herein is compatible with a variety of PMR writer structures and is not limited to the PMR writer depicted in FIG. 1.

Referring to FIG. 1, a PMR writer with a combined read head/write head structure currently fabricated by the inventors according to a process of record (POR) is depicted in a cross-sectional view from a plane that is orthogonal to an air bearing surface (ABS) 30-30. The combined read head/write head is formed on a substrate 1 that may be comprised of AlTiC (alumina+TiC). Those skilled in the art will recognize that layers 2-8 represent the read head portion of the recording device while layers 9-35 represent the write head portion. The substrate is typically part of a slider (not shown) formed in an array of sliders on a wafer. After the read head/write head is completed, the wafer is sliced to form rows of sliders. Each row is typically lapped to afford an ABS before dicing to fabricate individual sliders that are used in magnetic recording devices.

The present disclosure anticipates that one or more dynamic fly height (DFH) heater elements (not shown) may be formed in one or more insulation layers in the PMR writer structure to control the extent of thermal expansion (protrusion) along the ABS toward a magnetic medium 46 during a read or write process. Read gap (RG) and write gap (WG) protrusion may be tuned by the placement of the one or more DFH heater elements, and by the choice of metal or alloy selected for the DFH heater elements since each DFH heater resistor material has a particular thermal and mechanical response to a given electrical input.

A first insulation layer 2 that may be comprised of alumina or another dielectric material is disposed on substrate 1. There is a second insulation layer 3 formed on the first insulation layer and behind the read head layers 4-8. Above layer 2 is the S1 shield 4 that is comprised of NiFe or CoFeNi or the like, and extends from the ABS toward a back end of the read head. A read gap 5 is formed between the S1 shield 4 and top shield layer 7. A magnetoresistive element or sensor 6 is formed in the read gap 5 along the ABS 30-30 and typically includes a plurality of layers (not shown) in which two ferromagnetic layers are separated by a non-magnetic layer. The magnetic moment direction in one of the ferromagnetic layers is fixed and provides a reference direction, and the moment direction in the other ferromagnetic layer may be rotated by the magnetic field from the media. Resistance across the read gap changes as the moment in the second ferromagnetic layer rotates. A "0" or "1" magnetic state can be defined depending on whether the two ferromagnetic layers are magnetically aligned in the same direction or in an anti-parallel fashion. The non-magnetic layer in the sensor 6 may be comprised of Cu in a giant magnetoresistive (GMR) sensor, or may be an insulator such as alumina or MgO in a tunneling magnetoresistive (TMR) sensor.

A top shield layer 7, insulation layer 8, and shield layer 9 are formed sequentially on the read gap 5. In one embodiment, top shield layer 7 is the S2A shield and shield layer 9 is the S2B shield that also serves as the return path (RTP). In other embodiments, top shield layer 7 has a stack represented by S2A/insulation layer/S2B, and shield layer 9 is the RTP. Shield layers 7, 9 may be made of the same magnetic material as in the S1 shield 4. Insulation layer 8 may be the same dielectric material as in insulation layer 2. RTP 9 is recessed from the ABS but is able to transmit flux from magnetic medium 46 to main pole 18 through the leading loop return pathway that includes a leading shield 34, leading shield connector (LSC) 33, S2C shield 32, the RTP, and a back gap connection comprised of magnetic sections 15a-15c.

The BGC may be depicted with three sections formed in a laminated manner and represented by stack 15a/15b/15c wherein a bottommost (lower) section 15a contacts a top surface of RTP 9, and an uppermost section 15c with top surface 15s contacts a back portion of the bottom surface of main pole 18. In the exemplary embodiment, there is a first insulation layer 10 formed on the RTP and having an ABS facing side adjoining a bottom portion of the S2C 32 back side, and a back side abutting an ABS facing side of BGC lower section 15a. A second insulation layer 11 is formed on the first insulation layer and extends orthogonal to the ABS from an upper portion of the S2C back side to an ABS facing side of BGC section 15b. In some embodiments, a bucking coil layer 12 with three turns 12a-12c is formed within the second insulation layer and between the S2C back side and BCG section 15b. However, the present disclosure also anticipates that a bucking coil layer with one turn, two turns, or four turns in a 1+1T, 2+2T, or 4+4T configuration may be employed as appreciated by those skilled in the art. Bucking coils are wound in series with an opposite polarity to that in the driving coils 24 to minimize direct coupling between the first trailing shield 20 and driving coils. A top surface of the bucking coil layer is preferably coplanar with a top surface of the second insulation layer, a top surface of BGC section 15a, and a top surface of S2C shield 32.

The second insulation layer 11 may also be formed between the ABS 30-30 and an upper portion of the ABS facing side of S2C shield 32. First insulation layer 10 may be formed between the ABS and a bottom portion of the ABS facing side of the S2C shield. RTP 9 is formed within insulation layer 13 and is recessed a certain distance from the ABS. Insulation layers 10, 11, 13 are comprised of a dielectric material and the bucking coil layer 12 is typically a conductive material such as Cu. In the process of record (POR) practiced by the inventors, leading shield 34, LSC 33, S2C, back gap connection 15a-c, and RTP 9 may be made of CoFeN, NiFe, CoFe, CoFeNi with a Ms value of 10 kG to 16 kG.

A third insulation layer 16 contacts the top surface of the bucking coil turns 12a-12c and the second insulation layer 11 between a back side of LSC 33 and an ABS facing side of BGC section 15c. There is a fourth insulation layer 23 formed on the third insulation layer and on a back end portion of the LSC. The fourth insulation layer extends from a back side of the leading shield 34 to an ABS facing side of uppermost BGC section 15c. According to one embodiment, first through second insulation layers have a combined thickness in a down-track direction substantially the same as BGC section 15a, while third and fourth insulation layers have a thickness essentially the same as BGC sections 15b, 15c, respectively. Thus, top surface 23t of the fourth insulation layer is essentially coplanar with a top surface 15s of the BGC. In some embodiments, a bottom yoke (not shown) is provided between a lead gap 17a and a back portion of the main pole that adjoins top surface 15s. In the exemplary embodiment, insulation layer 36 contacts top surface 23t and has a thickness essentially equal to that of the lead gap.

Above insulation layer 36 is the main pole 18 that may be comprised of CoFe, NiFe, CoFeNi or another magnetic material. Main pole 18 has a front portion called a write pole with a write pole tip 14 at the ABS 30-30. The main pole extends toward the back end of the device where a back portion is magnetically connected with back gap connection 15a-c. The leading shield is separated from the main pole by the lead gap 17a. Flux from the main pole enters a magnetic medium (not shown) and returns in part as flux 70a though the leading loop comprised of LS 34, LSC 33, S2C 32, RTP 9, and BGC 15a-c.

Returning to FIG. 1, a first write shield layer 20 has a bottom surface formed on a write gap 17b at the ABS and extends a throat height distance away from the ABS 30-30 to an ABS facing (front) side of non-magnetic layer 21. The first write shield layer 20 also known as the first trailing shield may be made of CoFeN, CoFeNi, NiFe, or CoFe, for example, and may have a top surface that is coplanar with the top surface of non-magnetic layer 21. The first write shield may be a composite that includes a lower magnetic (hot seed) layer 20a with a high saturation magnetization value of about 24 kG or at least >19 kG contacting a top surface of the write gap, and an upper magnetic layer 20b that adjoins a bottom surface of an overlying second trailing shield also known as PP3 trailing shield 26. The trailing shield structure serves as a flux return pathway 70b wherein flux from a magnetic medium enters the first write shield and passes through the PP3 trailing shield to a back portion of main pole 18. The first trailing shield layer 20b and PP3 trailing shield are typically made of 10-19 kG layers, and more specifically, 16 kG-19 kG materials.

There is a top yoke 39 adjoining a back side of the non-magnetic layer 21 and contacting a top surface of the main pole 18. The top yoke and bottom yoke transmit magnetic flux to the main pole where the flux 70 is concentrated at the write pole tip 14. The top yoke extends to a back side at point A where the top yoke touches the inner corner of PP3 26 above a back portion of the main pole. A bottom yoke may be included in the write head structure to provide a faster writer response compared with designs where only a top yoke is employed. An insulation layer 22 is formed on a portion of the non-magnetic layer 21 and top yoke. Passing a current through the driving coil layer 24 that is disposed on the insulation layer 22 generates magnetic flux in the top yoke 39 and in the main pole. The driving coil layer 24 may have one or a plurality of turns. Three turns are depicted above the main pole in this embodiment. Bucking coils are connected to driving coils through connector 31 that is a greater distance from the ABS than BGC 15a-c.

First trailing shield 20 is separated from write pole tip 14 at the ABS by a write gap 17b that is made of an insulation material. Trailing shield layer 26 referred to as the PP3 shield is formed on first trailing shield 20 along the ABS and on a portion of insulation layer 22 that is above non-magnetic layer 21. In the exemplary embodiment, the PP3 trailing shield arches over the first three driving coils in layer 24 and connects with the top surface of the top yoke above the BGC 15a-c. The PP3 trailing shield may have a dome shape as in the exemplary embodiment or may have a planar top surface that is parallel to a top surface of the main pole. An insulation layer 25 is formed on the insulation layer 22 and fills the openings between the turns of driving coil layer 24 and the space between a top surface of the driving coils and a bottom surface of the PP3 shield layer 26. A protection layer 27 covers the PP3 trailing shield and is made of an insulating material such as alumina. Above the protection layer and recessed a certain distance from the ABS 30-30 is an optional cover layer 29 that is preferably comprised of a low CTE material such as SiC that serves to reduce the WG protrusion rate. The SiC cover layer is recessed to avoid introducing a material at the ABS with different mechanical and etch resistance properties than adjacent layers which could adversely affect back end lapping and ion beam etching processes. An overcoat layer 28 is formed as the uppermost layer in the write head.

The PMR writer in FIG. 1 has two pathways for magnetic flux to return to the write head from a magnetic medium 46. For example, magnetic flux 70 from main pole 18 exits through write pole tip 14 into a magnetic medium and may return via leading loop 70a as described previously. Flux from the magnetic medium also returns to the write head via pathway 70b by entering first write shield 20 at the ABS and then passing through PP3 trailing shield 26 before reaching the main pole. The dual flux return pathway in the POR design is employed to reduce STE. Typically, about 50% of flux returns through pathway 70a and about 50% through pathway 70b in FIG. 1 that depicts a double write shield (DWS) configuration.

Figure 2:
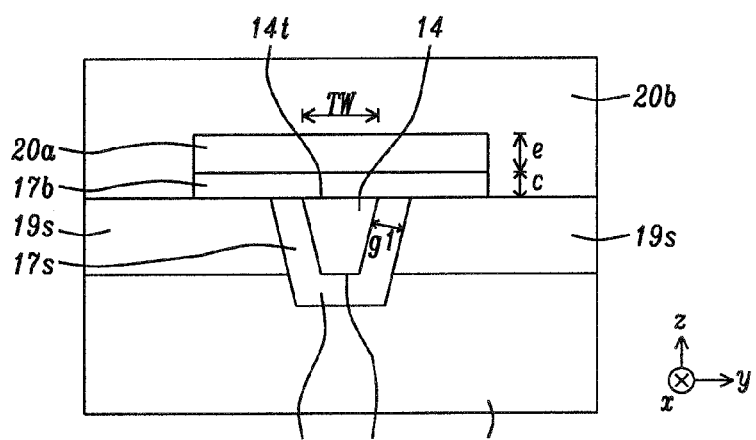
FIG. 2 is an ABS view of the PMR writer in FIG. 1 that shows a 10-19 kG magnetic shield layer adjoining a gap layer adjacent to the sides including the leading side of a main pole according to a prior art design.

Referring to FIG. 2, an ABS view of the PMR writer in FIG. 1 is depicted according to a POR design. Leading shield 34, side shields 19s and trailing shield 20b form an all wrap around (AWA) shield structure. Leading shield and side shields are made of a 10-16 kG material, first trailing shield layer 20b is made of a 16-19 kG material, and first trailing shield hot seed layer 20a is typically a >19 kG to 24 kG magnetic material. The leading shield adjoins a bottom surface of lead gap 17a, and side shields adjoin a side of the side gap that is a side gap distance g1 from the write pole tip 14. Write gap 17b has a thickness c, and a greater cross-track width than track width TW of the write pole 14. The write gap contacts a top surface (trailing side) 14b of the write pole tip in addition to top surfaces of side gaps 17s and side shields 19s. Trailing shield hot seed layer 20a may have a cross-track width that is essentially equivalent to that of the write gap, and has a thickness e.

The PMR writer in FIGS. 1-2 currently fabricated by the inventors requires optimization for use in advanced technologies. In particular, a thinner write gap thickness c, and narrower side gap dimension g1 are the preferred directions for better on track field gradient (BPI) and cross-track field gradient (TPI), respectively. To enhance write-ability, side shield height reduction is important not only to reduce main pole flux shunting to side shields, but also to allow more main pole volume closer to the ABS. Note that height reduction refers to the distance the side shields 19s extend from the ABS in an x-axis direction. However, side shield height reduction below 0.3 micron is likely to cause side shield saturation and degradation in cross-track gradient in the POR design in FIG. 1. For advanced PMR writer designs, it is desirable to have write-ability from side shield height reduction and more main pole volume closer to the ABS while maintaining a good cross-track field gradient (TPI capability).

In related patent application HT14-026, we disclosed a PMR writer with an all wrap around (AWA) shield design in which one or more of the leading shield, second trailing shield, and side shields consist of a high damping (HD) magnetic material having a damping constant ≥0.04. As a result, wide adjacent track erasure is minimized while area density capability is maintained.

As disclosed in related patent application Ser. No. 14/690, 693, the aforementioned objectives are substantially achieved with a PMR writer depicted in FIG. 3a having an AWA shield structure wherein the side shields each have a high Ms (hot seed) layer 19h made of a >19 kG to 24 kG material and with thickness w1 formed at an interface with the side gap 17s, and a second magnetic layer 19s made of 10-16 kG material adjoining a side of the hot seed layer that is opposite the side gap. Furthermore, the leading shield preferably has an uppermost hot seed layer 34h that interfaces with the lead gap 17a and contacts the side shield hot seed layers, and a lower magnetic layer 34 made of 10-16 kG material that adjoins the second magnetic layers in the side shields. Hot seed layer 34h is preferably comprised of the same material as in the side shield hot seed layer and has a thickness w1. As a result, when side gap dimensions are reduced to a 20-50 nm range, and side shield height is decreased to 0.3 micron or less, side shield saturation may be prevented while write-ability is maintained or enhanced.

The first trailing shield structure comprised of hot seed layer 20a and a second magnetic layer 20b is retained from FIG. 2. In this embodiment, hot seed layer 20a and write gap 17b have a cross-track width d that is greater than the track width TW, and a cross-track width of the leading shield hot seed layer 34h. A portion of the second magnetic layer 20b in the first trailing shield contacts the top surfaces of side shields 19s that are adjacent to the ends of write gap 17b.

Figure 3A:
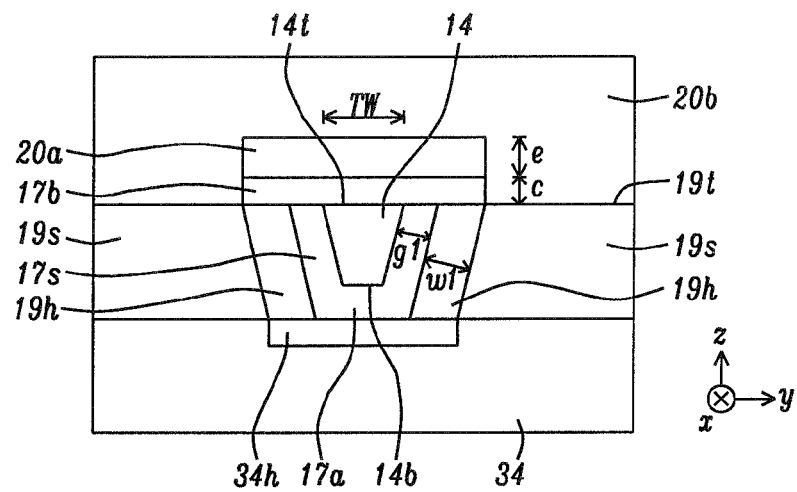
FIG. 3a is an ABS view of the PMR writer according to process of record (POR) design of the inventors wherein the PMR writer in FIG. 2 is modified to include a hot seed (high Ms) layer adjoining the lead gap and side gap layers.
Figure 3B:
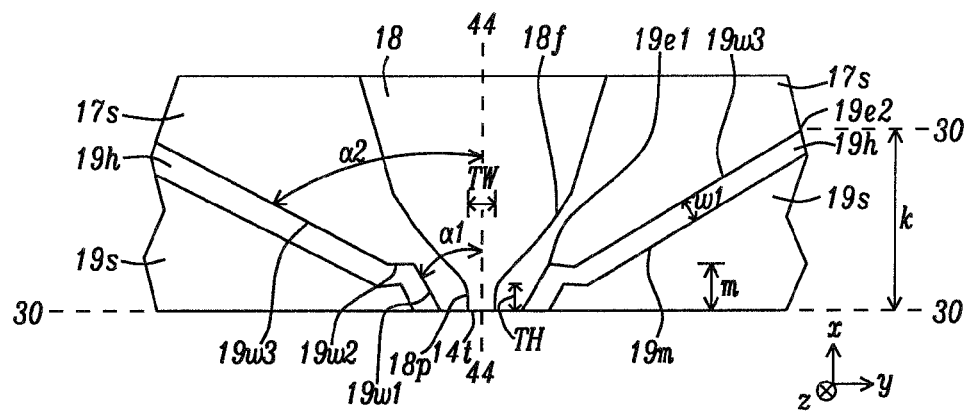
FIGS. 3b-3c are top-down views of the PMR writer in FIG. 3a that has a double tapered side shield (dtss) configuration and a single taper side shield, respectively.

Referring to FIG. 3b, a top-down view of the side shield structure from FIG. 3a is shown with the write gap and trailing shield layers removed. The write pole 14 extends a throat height TH from trailing edge 14t at the ABS 30-30 and connects with flared sides 18f on the main pole layer 18. A center plane 44-44 bisects the main pole and is aligned orthogonal to the ABS in an x-axis direction. According to one embodiment, each side shield is double tapered in a so-called dtss design and has a first side 19w1 of hot seed layer 19h that faces the write pole and extends from the ABS to a height m at end 19e1. The first side 19w1 preferably forms a first angle α1 with respect to the center plane. In some embodiments, there is a short second side 19w2 of hot seed layer 19h that is formed substantially parallel to the ABS and from end 19e1 to a third side 19w3. The third side of hot seed layer 19h faces flared side 18h and forms an angle α2 with respect to the center plane where α2>α1. Third side 19w3 terminates at end 19e2 that is a height k from the ABS where k>m. The second magnetic layer 19s in each side shield is formed between the ABS and hot seed layer 19h.

Figure 3C:
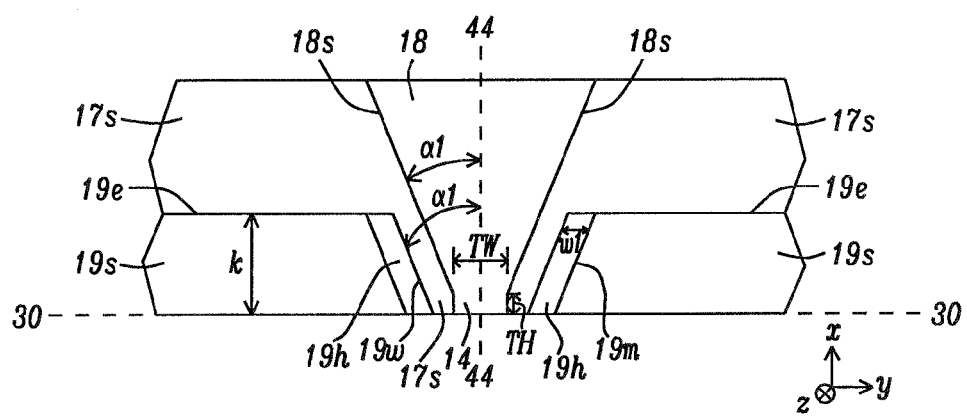

In FIG. 3c, an alternative embodiment is shown from a top-down view wherein sides 18s of main pole 18 are substantially planar at a distance greater than the throat height TH, and extend toward a back end of the PMR writer at an angle α1 with respect to center plane 44-44. In this case, hot seed layer 19h and side shield layer 19s have a common back side 19e that is parallel to the ABS and a height k therefrom. Each of the hot seed layer 19h and side shield layer 19s have a main pole facing side 19w, 19m, respectively, that is parallel to the nearest main pole side 18s.

Figure 3D:
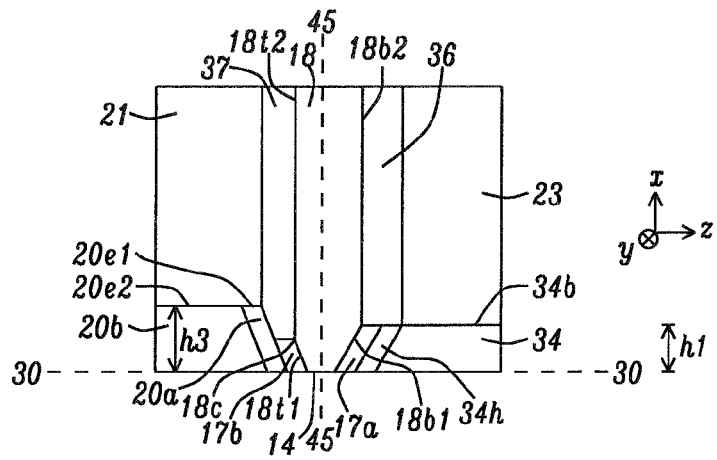
FIGS. 3d-3e are down-track cross sectional views of the PMR writer in FIG. 3a wherein the hot seed layer in each of the leading shield and trailing shield has one or two sections, respectively.

In FIG. 3d, a down-track cross-sectional view along plane 44-44 in FIG. 3b (or FIG. 3c) is taken and depicts an embodiment where the main pole has a tapered leading side 18b1 that extends from the ABS 30-30 to a first height h1. There is a second leading side 18b2 of the main pole that is aligned parallel to a second plane 45-45 which is orthogonal to the ABS and to plane 44-44. The second leading side extends from an end of the tapered leading side toward a back end of the PMR writer. Moreover, the main pole has a tapered trailing side 18t1 that extends from the ABS to a height h3 at corner 18c. A second trailing side 18t2 of the main pole adjoins an end of tapered trailing side 18t1 at corner 18c and extends toward a back end of the PMR writer in a direction that is parallel to the second plane.

Leading shield layers 34, 34h each have a tapered side that faces the main pole 18 and is aligned substantially parallel to main pole side 18b1, and have a back side 34b at the first height h1 that adjoins an ABS facing side of insulation layer 23, and insulation layer 36, respectively. Insulation layer 36 is formed between insulation layer 23 and main pole leading side 18b2. Leading shield hot seed layer 34h adjoins the trailing side of the leading shield layer 34. Leading gap 17a preferably has a uniform thickness in a down-track direction, fills the space between hot seed layer 34h and main pole leading side 18b1, and adjoins a front side of insulation layer 36 at the first height.

Write gap 17b preferably has a uniform thickness in a down-track direction, is formed between a tapered portion 20a1 of the first trailing shield hot seed layer and main pole trailing side 18t1, and has a back side that adjoins a front side of insulation layer 37 at corner 18c. Tapered portion 20a1 has a front side at the ABS 30-30 and a back side 20e1 at a third height h3. First trailing shield layer 20b preferably has a back side 20e2 that is parallel to the ABS and formed at a third height from the ABS.

Figure 3E:
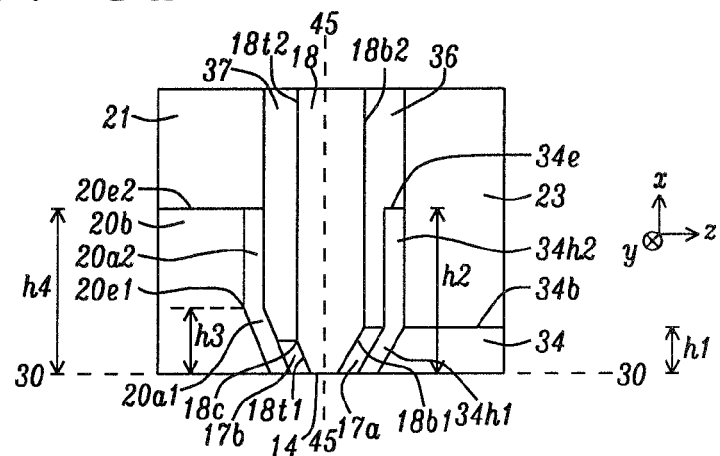

Referring to FIG. 3e, another embodiment is depicted where all features are retained from FIG. 3d except the leading shield hot seed layer and trailing shield hot seed layer are each comprised of two portions. A first portion 34h1 of the leading shield hot seed layer corresponds to hot seed layer 34h in the previous embodiment. Second portion 34h2 adjoins the back side of the first portion at the first height h1 and is aligned parallel to plane 45-45 with a back end at a second height h2 that may be as large as 1 micron from the ABS. The volume of insulation layer 36 is reduced compared with the previous embodiment, but separates the second portion 34h2 from main pole leading side 18b2. In addition, a first portion 20a1 of the trailing shield hot seed layer corresponds to hot seed layer 20a in the previous embodiment. Second portion 20a2 adjoins the back side of the first portion at the third height h3 and is aligned parallel to plane 45-45 with a back end 20e2 at a fourth height h4. Second portion 20a2 has a back side that adjoins an ABS facing side of non-magnetic layer 21. Preferably, the back side of the second magnetic layer 20b adjoins the ABS facing side of non-magnetic layer 21 at the fourth height.

We have now discovered additional improvements in the composite shield structure shown in FIGS. 3a-3e and the AWA shield described in related U.S. Pat. No. 8,427,781 that may be implemented to further improve PMR writer response and ADC. In particular, a high damping (HD) magnetic layer having a Gilbert damping parameter >0.04 is inserted between the hot seed layer and adjoining magnetic layer in one or more shields, or optionally, is employed as a replacement for one or more of the 10-16 kG magnetic layers 19s, 34 in the side shields and leading shield, respectively, of the AWA scheme. The exemplary embodiments illustrate the inclusion of a HD magnetic layer in each shield wherein the HD magnetic layer is made of a 10-16 kG material in the side shields and leading shield, and is a 16-19 kG material in the first trailing shield.

The HD magnetic layer is preferably comprised of $Fe_xNi_{100-x}M$ that is an Fe rich alloy with an x content of ≥50 atomic % and where M is a transition metal with a content between 3 and 15 atomic %. However, other alloys including but not limited to FeCoM, and FeCoNiM where M is one of Re, Os, Ir, Rh, Ti, Ta, V, Cr, W, Mn, Mo, Cu, Zr, Nb, Hf, Ru, Pd, Pt, Ag, and Au with an M content of 3-15 atomic % may also be employed as the HD magnetic layer. Preferably, the HD magnetic layer has a damping parameter a which is at least 50% and preferably more than 100% greater than a typical a value of about 0.02 for commonly used alloys such as FeCo, FeNi, and FeCoNi in shield structures. As the M content in the alloy increases, a also becomes larger but at the expense of decreasing Ms. Thus, M has an upper limit of about 15 atomic % to prevent the Ms value in the HD magnetic layer from dropping below 10 kG in the side shields and leading shield, and below 16 kG in the trailing shield. M has a "y" content of at least 3 atomic % to yield a substantial increase in a to a value >0.04 for a $(Fe_xNi_{100-x})_{100-y}Re_y$ HD layer compared with a $Fe_xNi_{100-x}$ layer, for example.

Figure 4A:
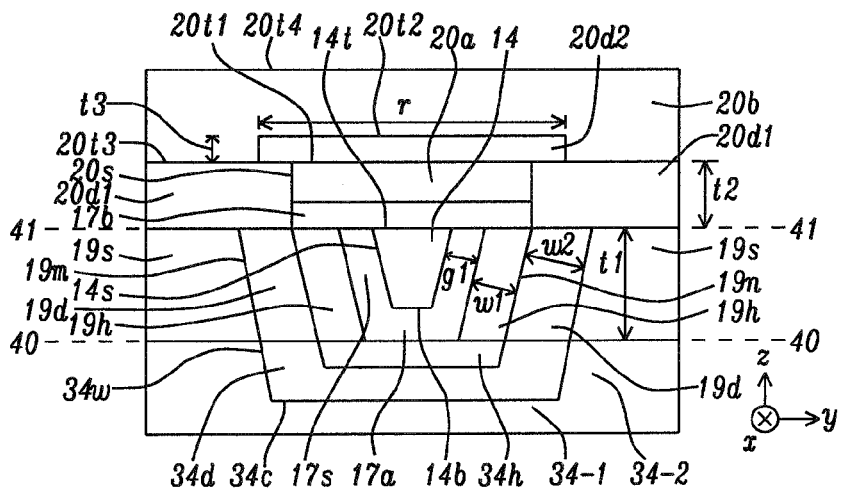
FIG. 4a is an ABS view of the PMR writer according to a first embodiment of the present disclosure wherein each shield comprises a high Ms layer adjoining a gap layer, and an adjacent high damping magnetic layer in an AWA shield design.

Referring to FIG. 4a, a first embodiment of the present disclosure is depicted wherein the features of the shield structure in FIG. 3a are retained except the 10-16 kG magnetic layers 34, 19s, and the 16-19 kG layer 20b no longer contact a side of a hot seed layer. Instead, the AWA design is modified to include a third (HD) magnetic layer in each of the side shields, leading shield, and trailing shield. In the leading shield, an upper portion of magnetic layer 34 is replaced by HD magnetic layer 34d that adjoins the side and bottom surfaces of hot seed layer 34h, and contacts bottom surfaces of HD magnetic layers 19d in the side shields along plane 40-40. Thus, the leading shield is considered to have a composite structure wherein an "inner" hot seed layer 34h contacts the lead gap 17a and is aligned below the write pole 14, a middle HD magnetic layer has a planar bottom surface 34c aligned parallel to main pole leading edge 14b, and a 10-16 kG layer comprised of a lower portion 34-1 and upper portion 34-2 is the "outer" layer. Lower portion 34-1 contacts bottom surface 34c while upper portion 34-2 adjoins sidewalls 34w of the middle HD magnetic layer and contacts the bottom surfaces of side shield layers 19s along plane 40-40. Down-track thickness w1 of hot seed layer 34h is 20-70 nm while down-track thickness w2 of HD magnetic layer 34d is 30 nm or greater. Sidewalls 34w of the middle HD magnetic layer may be aligned essentially parallel to the down-track direction such that cross-track width s of bottom surface 34c is substantially the same as the cross-track distance between outer sidewalls 19m of HD magnetic layers 19d at plane 40-40. In the exemplary embodiment shown in FIG. 4a, each sidewall 34w may optionally be formed coplanar with a sidewall 19m of the side shield layer 19s above plane 40-40. As described in a later section with regard to FIG. 8a, sidewall 19m may have a bevel angle β from 0 to 5 degrees with respect to center plane 44-44.

Each side shield is a composite with an inner hot seed layer 19h having a cross-track width w1, a HD magnetic layer 19d with cross-track width w2 that adjoins a side of the inner hot seed layer facing away from the write pole 14, and an outer 10-16 kG layer 19s. Preferably, the write pole facing side of each side shield layer at the ABS is substantially parallel to a nearest side 14s of the write pole. A top surface of each side shield layer as well as the top surface of side gaps 17s and trailing edge 14t are formed along plane 41-41 that is located a down-track distance t1 from plane 40-40. Width w1 is preferably 20 to 70 nm while w2 is preferably 30 nm or greater. Furthermore, w1 and w2 in the side shields are preferably equivalent to w1 and w2 in the leading shield since the HD magnetic layers 19d, 34d are typically deposited as a first conformal layer, and hot seed layers 19h, 34h are typically deposited as a second conformal layer during the fabrication process as explained later.

The first trailing shield has a hot seed layer 20a formed on a top surface of write gap 17b that faces away from main pole trailing edge 14t, and where the hot seed layer has sidewalls 20s and a top surface 20t1. The first trailing shield also includes a HD magnetic layer with a first portion 20d1 that adjoins the sidewalls 20s on each side of the hot seed layer 20a, and wherein the first portion has a top surface 20t3 which may be coplanar with top surface 20t1 and has a thickness t2 of 30 to 300 nm. The HD magnetic layer in the trailing shield also has a second portion 20d2 that contacts the top surface 20t1 of the hot seed layer and has a thickness t3 that may be equal to t2, a cross-track width r greater than the width of hot seed layer 20a, and a top surface 20t2 aligned substantially parallel to plane 41-41. The uppermost layer in the composite trailing shield is magnetic layer 20b that contacts top surfaces 20t2 and 20t3 of the HD magnetic layer portions 20d2, 20d1, respectively. In some embodiments, the thickness t3 of the HD magnetic layer second portion is less than t2 in order to promote a higher fraction of magnetic flux (not shown) in the return loop through hot seed layer 20a than in embodiments where t2=t3 thereby achieving a better down-track field gradient and improved ADC.

Figure 4B:
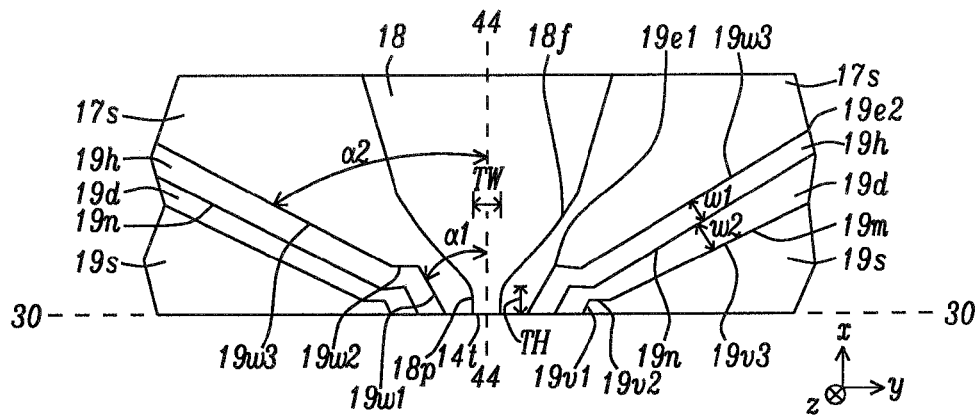
FIGS. 4b-4c are top-down views of the PMR writer in FIG. 4a that has a double tapered side shield (dtss) configuration and a single taper side shield, respectively.

In FIG. 4b, a top-down view of the composite side shield structure in FIG. 4a is shown with the trailing shield and overlying layers removed. According to one embodiment wherein the shield structure has a dtss design previously described in FIG. 3b, the features of FIG. 3b are retained except the 10-16 kG magnetic layer 19s is reduced in size to enable HD magnetic layer 19d to be inserted between hot seed layer 19h and main pole facing sides 19v1-19v3 of magnetic layer 19s. Preferably, HD magnetic layer 19d has a main pole facing side 19n wherein sections thereof are formed parallel to a nearest side 19w1, 19w2, or 19w3, respectively, of hot seed layer 19h. Thus, a first section of HD magnetic layer side 19n that is parallel to side 19w1 (and side 19v1) is formed at an angle α1 with respect to center plane 44-44, and a second section of the HD magnetic layer side 19n that is aligned parallel to side 19w3 (and side 19v3) is formed at an angle α2 with respect to the center plane.

Figure 4C:
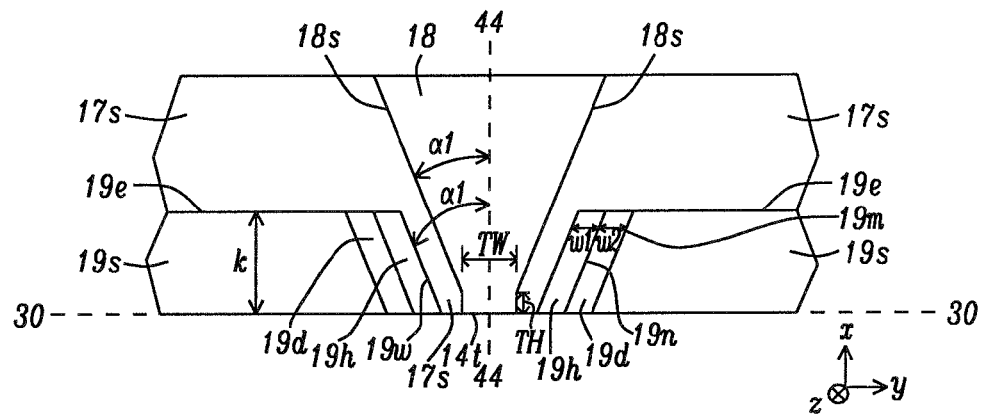

In an alternative embodiment shown in FIG. 4c, the top-down view of the composite side shield structure in FIG. 4a retains all the features of the design in FIG. 3c except each side shield layer 19s is reduced in size to allow HD magnetic layer 19d to be formed between hot seed layer 19h and a main pole facing side 19m of magnetic layer 19s. In other words, HD magnetic layer 19d has a main pole facing side 19n formed parallel to inner side 19w of hot seed layer 19h, parallel to side 19m of outer magnetic layer 19s, and parallel to a nearest side 18s of the main pole 18. All three magnetic layers 19*h*, 19*d*, and 19*s* have a back side formed at height k from the ABS 30-30.

Figure 4D:
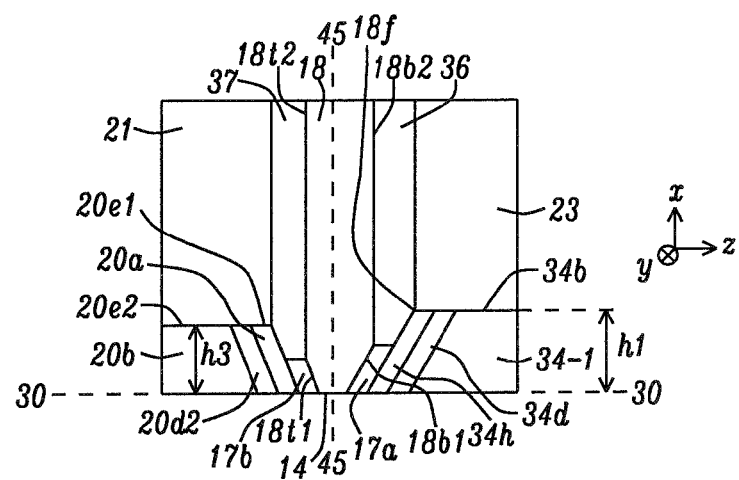
FIGS. 4d-4e are down-track cross sectional views of the PMR writer in FIG. 4a wherein the hot seed layer in each of the leading shield and trailing shield has one or two sections, respectively.

Referring to FIG. 4*d*, a down-track cross-sectional view of the composite trailing shield and composite leading shield in FIG. 4*a* is shown according to one embodiment. The shield structure from FIG. 3*d* is retained except the leading shield layer 34 (portion 34-1) and trailing shield layer 20*b* are reduced in size to enable HD magnetic layers 34*d* and 20*d*2 to be formed at a side of hot seed layers 34*h*, 20*a*, respectively, that face away from the main pole. Preferably, the leading shield has layers 34*h*, 34*d*, and 34-1 each with a side facing tapered main pole side 18*b*1 and aligned substantially parallel to side 18*b*1, and each having a back side 34*b* at a first height h1 from the ABS 30-30. Likewise, the first trailing shield has layers 20*a*, 20*d*2, and 20*b* each having a side facing tapered main pole side 18*t*1 and formed parallel thereto. Furthermore, HD layer 20*d*2 and magnetic layer 20*b* each have a back side 20*e*2 at a third height h3. In some embodiments, back side 34*b* adjoins an ABS facing side of insulation layer 23, and back side 20*e*2 adjoins an ABS facing side of non-magnetic layer 21. The present disclosure also anticipates that back side 34*b* and first height h1 may be a greater distance from the ABS than corner 18*f* where tapered leading side 18*b*1 connects with leading side 18*b*2.

Figure 4E:
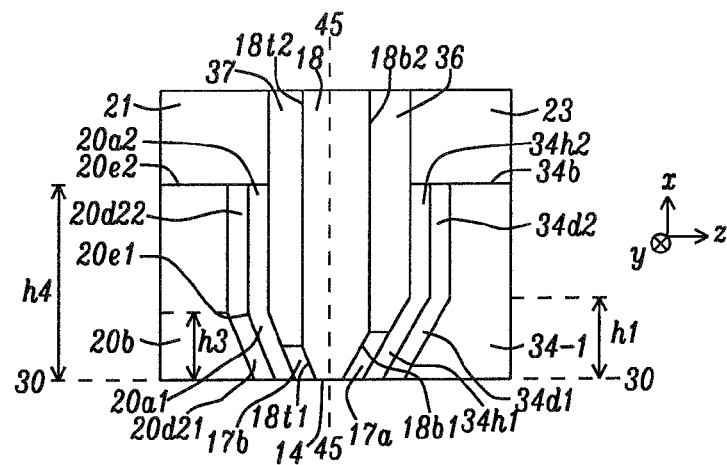

Referring to FIG. 4*e*, another embodiment of the composite trailing shield and composite leading shield in FIG. 4*a* is depicted from a down-track cross-sectional view. All features are retained from the shield structure in FIG. 3*e*. In addition, a first portion 34*d*1 of a leading shield HD magnetic layer is inserted between hot seed layer 34*h*1 and leading shield layer 34 (portion 34-1), and a second portion 34*d*2 of the HD magnetic layer is inserted and adjoins the first portion 34*d*1 at a first height distance, and extends parallel to plane 45-45 to a back side 34*e* which is at a second height h2. Similarly, a first portion 20*d*21 of a trailing shield HD magnetic layer is formed between hot seed layer 20*a*1 and first trailing shield layer 20*b* while a second portion 20*d*22 of the HD magnetic layer adjoins the back side of the first portion 20*d*21 at a third height h3 and extends parallel to plane 45-45 to a fourth height h4 at back side 20*e*2. Optionally, layers 34*d*2 and 34*h*2 may be omitted, or layers 20*d*22 and 20*a*2 may be omitted. Note that HD magnetic layer 34*d*2 may be formed within dielectric layer 23. Preferably, the down-track thickness of HD magnetic layer 34*d*2 is substantially equivalent to that of HD magnetic layer 34*d*1, and the down-track thickness of HD magnetic layer 20*d*22 is substantially equivalent to that of HD magnetic layer 20*d*21.

The present disclosure also encompasses an embodiment where a HD magnetic layer as previously described may completely replace one or more of the 10-16 kG magnetic layers 34 and 19*s* in the leading shield and side shields, respectively, in the AWA shield design depicted in FIGS. 3*a*-3*e*. In the exemplary embodiments illustrated in FIGS. 5*a*-5*e*, all of the side shields and leading shield in the AWA shield scheme have an "inner" hot seed layer made of a >19 kG to 24 kG material, and an "outer" HD magnetic layer having a Gilbert damping parameter a >0.04 and made of a 10-16 kG material such as FeNiRe or alternative alloys mentioned earlier.

Figure 5A:
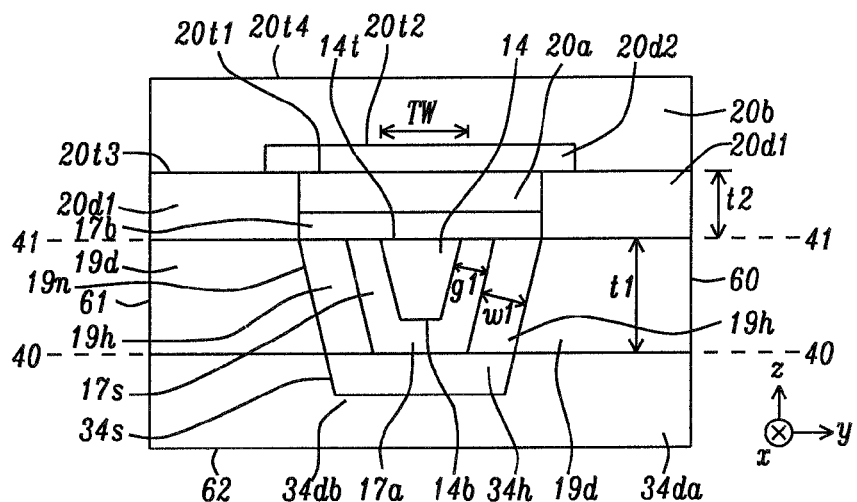
FIG. 5a is an ABS view of the PMR writer according to a second embodiment of the present disclosure wherein each of the composite leading shield, side shields, and trailing shield consist of a high Ms layer adjoining a gap layer, and an adjacent high damping magnetic layer in an AWA shield design.
Figure 15:
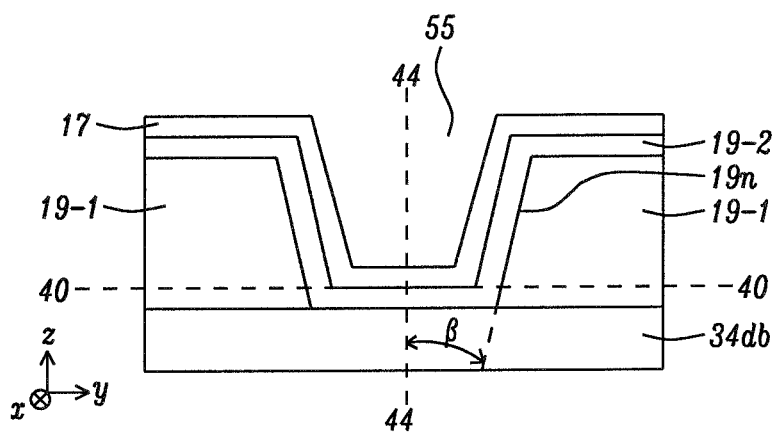
FIGS. 15-16 are ABS views showing a sequence of steps wherein an AWA shield structure is formed according to a second embodiment of the present disclosure.

Referring to FIG. 5*a*, a second embodiment of the present disclosure is shown where the shield structure in FIG. 4*a* is modified by omitting magnetic shield layers 34 (portions 34-1, 34-2) and 19*s* and replacing them with HD magnetic layers 34*d*, and 19*d*, respectively. In other words, HD magnetic layers 34*d*, and 19*d* continue to have a main pole facing side that adjoins a side of hot seed layer 34*h*, and hot seed layer 19*h*, respectively, that is a distance w1 from the gap layer 17*a* (or 17*s*). However, the cross-track dimension of HD magnetic layer 19*d* is increased substantially greater than w2 such that the HD magnetic layer now contacts a side 60 or 61 of each side shield. Also, leading shield HD magnetic layer is expanded in a down-track direction to contact bottom surface 62 of the AWA shield structure. In one aspect, the leading shield HD magnetic layer has an upper portion 34*da* that adjoins the sides of hot seed layer 34*h*, and a bottom portion 34*db* that adjoins a bottom surface of hot seed layer 34*h* and bottom surface 62 of the shield structure. Sidewall 34*s* of hot seed layer 34*h* may have a bevel angle β from 0 to 5 degrees and may be formed coplanar with sidewall 19*n* that has bevel angle β with respect to center plane 44-44 as depicted in FIG. 15.

Figure 5B:
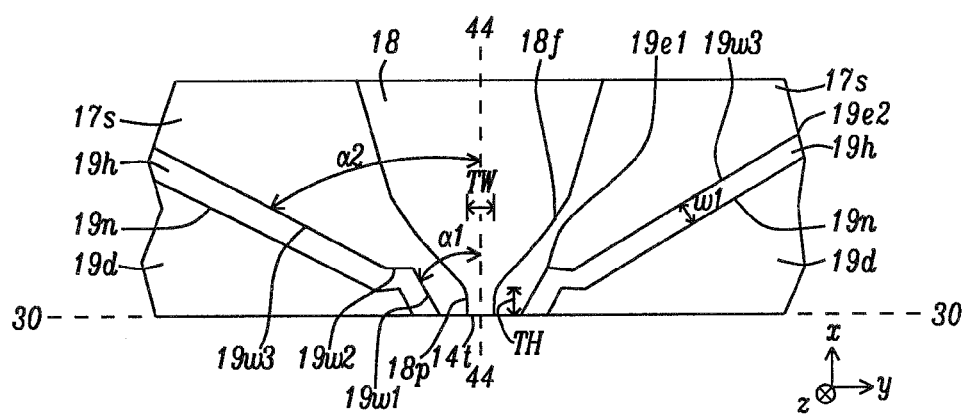
FIGS. 5b-5c are top-down views of the PMR writer in FIG. 5a that has a double tapered side shield (dtss) configuration and a single taper side shield, respectively.

In FIG. 5*b*, a top-down view of the side shield structure in FIG. 5*a* is depicted according to one embodiment of the present disclosure and represents a modification of the side shield structure in FIG. 4*b* where side shield 19*s* is replaced by HD magnetic layer 19*d* such that the side shield HD magnetic layer completely fills the space between sidewall 19*n* and the ABS 30-30.

Figure 5C:
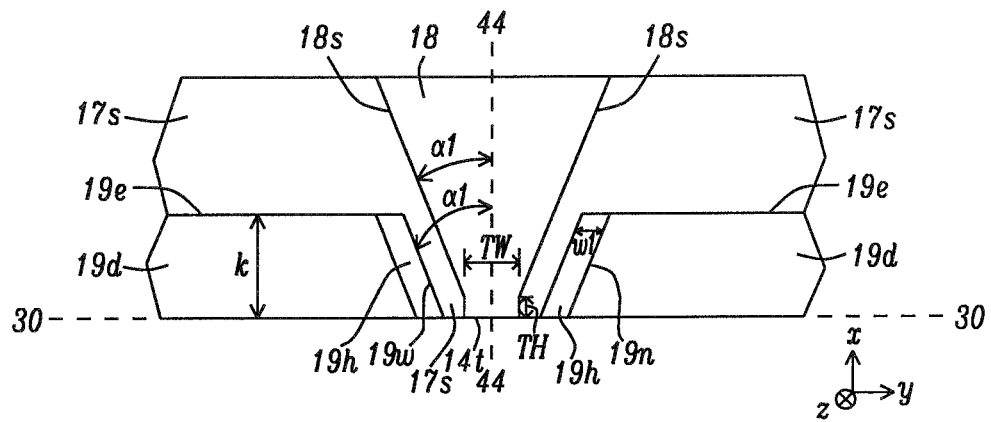

Referring to FIG. 5*c*, a second embodiment of the side shield structure in FIG. 5*a* is shown from a top-down perspective and represents a modification of the side shield structure in FIG. 4*c* where HD magnetic layer 19*d* is expanded in a cross-track direction to completely replace side shield layer 19*s*. As a result, hot seed layer 19*s* has a width w1, and the HD magnetic layer 19*d* has a cross-track width substantially larger than w2 in the first embodiment. Both side shield layers continue to have a back side 19*e* at height k.

Figure 5D:
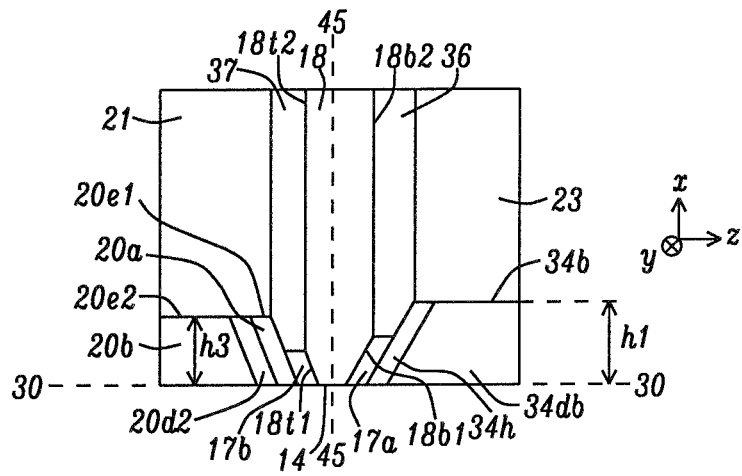
FIGS. 5d-5e are down-track cross sectional views of the PMR writer in FIG. 5a wherein the hot seed layer in each of the leading shield and trailing shield has one or two sections, respectively.

Referring to FIG. 5*d*, a down-track cross-sectional view is shown of one embodiment of the composite leading shield and composite trailing shield in FIG. 5*a* along plane 44-44. In particular, the shield structure in FIG. 4*d* is modified such that HD magnetic layer 34*db* adjoins a surface of hot seed layer 34*h* that faces away from main pole leading side 18*b*1 but has been expanded in a down-track direction to completely replace leading shield layer 34-1. HD magnetic layer 34*db* and hot seed layer 34*h* have a back side 34*b* at a first height h1 from ABS 30-30.

Figure 5E:
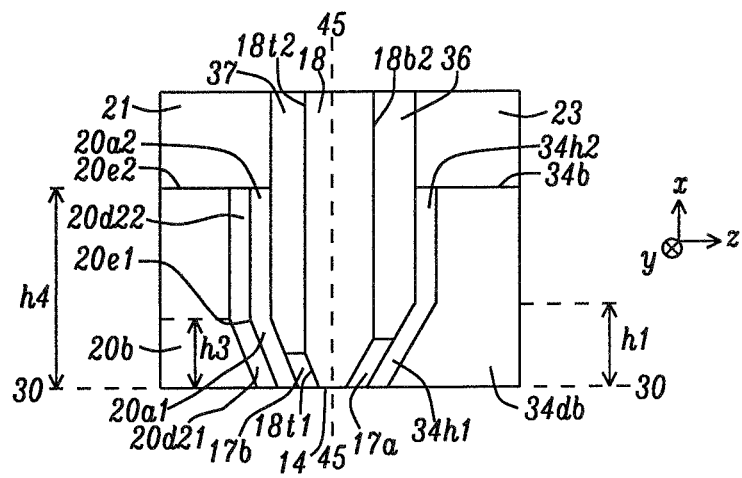

According to another embodiment of a down-track cross-sectional view of the shield structure in FIG. 5*a* that is depicted in FIG. 5*e*, HD magnetic layer portions 34*d*1, 34*d*2 in the first embodiment shown in FIG. 4*e* are replaced by bottom portion 34*db* and expanded in a down-track direction away from hot seed layer portions 34*h*1, 34*h*2 to completely replace leading shield portion 34-1, and a portion of dielectric layer 23, respectively, thereby forming a back side 34*b* of bottom portion 34*db* at a second height h2 from the ABS 30-30.

Figure 6A:
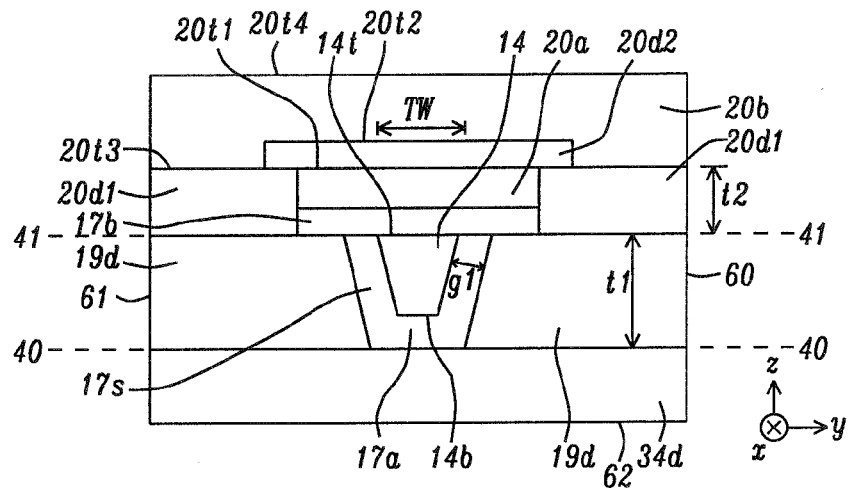
FIGS. 6a, 6b, 6c are ABS, top-down, and down-track cross-sectional views, respectively, of a AWA shield design according to a third embodiment of the present disclosure.
Figure 6B:
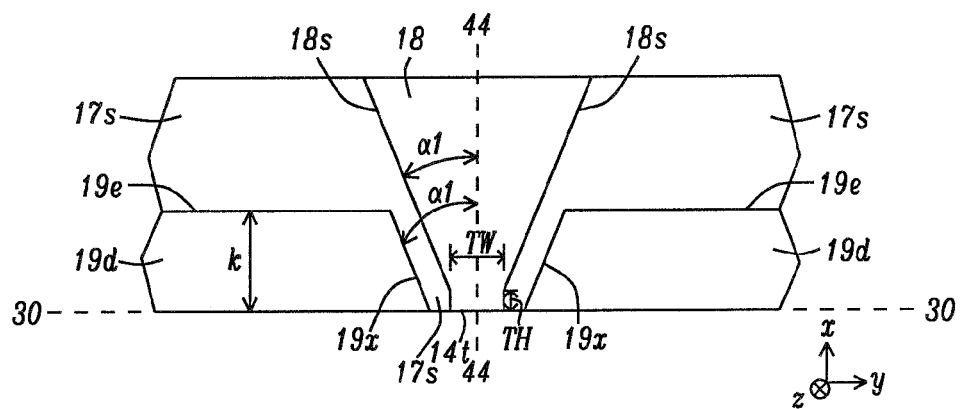
Figure 6C:
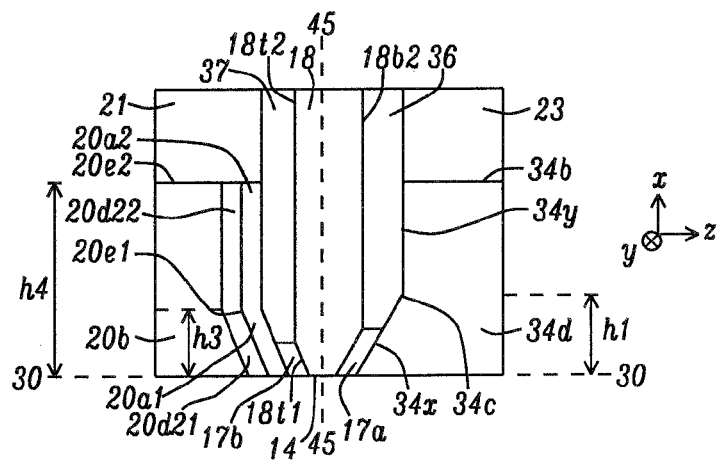

According to a third embodiment of the present disclosure depicted in FIGS. 6*a*-6*c*, the leading shield and side shields are entirely made of high damping magnetic layers 34*d*, 19*d*, respectively, that were described earlier. In FIG. 6*a*, each side shield 19*d* has a thickness t1 between plane 40-40 and plane 41-41 and extends in a cross-track direction from side gap 17*s* to a side 60 (or 61) of the shield structure. In this embodiment, leading shield HD magnetic layer 34*d* contacts the lead gap along plane 40-40 at the ABS.

FIG. 6*b* is a top-down view according to one embodiment of the shield structure in FIG. 6*a* where the trailing shield layers and write gap are removed. HD magnetic layer 19*d* has a side 19*x* that adjoins the side gap 17*s* and is formed substantially parallel to the nearest side 18*s* of the main pole.

Each side 19x faces the main pole 18 and is formed at an angle α1 with respect to center plane 44-44. A back side of HD magnetic layer 19d is at a height k from the ABS 30-30.

FIG. 6c depicts a down-track cross-sectional view of one embodiment of the shield structure in FIG. 6a wherein leading shield HD magnetic layer 34d with back side 34b has a first side 34x formed substantially parallel to main pole leading side 18b1 and wherein the first side contacts lead gap 17a and extends from the ABS 30-30 to corner 34c at a first height h1 from the ABS. HD magnetic layer 34d may also have a second side 34y that extends from one end at corner 34c and parallel to main pole side 18b2 to a second height h2 from the ABS. In an alternative embodiment (not shown), HD magnetic layer 34d has a single side 34x facing the main pole and the back side 34b is formed at the first height.

Figure 7:
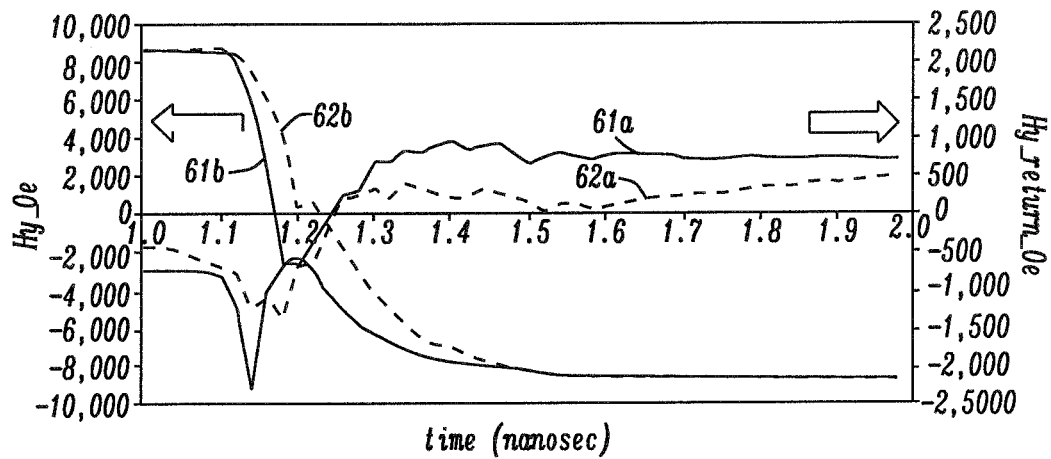
FIG. 7 is a plot showing a micromagnetic modeling comparison of the conventional PMR writer shield structure in FIG. 2 with an AWA shield design according to an embodiment of the present disclosure.

FIG. 7 is a graph showing the results of a micromagnetic modeling study wherein lines 62a and 62b represent the return field, and write field, respectively, for the PMR writer with the AWA shield structure in FIG. 2 where all shields have damping parameter a=0.02, and lines 61a and 61b are the return field, and write field, respectively, for the AWA shield design in FIG. 6a where HD magnetic layers have a=0.05 according to an embodiment of the present disclosure. The results indicate that the combination of including a hot seed layer on each side of the main pole, and a high damping magnetic layer adjoining an "outer" side of each hot seed layer, both of a higher return field and faster speed compared with the prior art can be achieved. These results are believed to occur because the magnetization rotation wave associated with the Hy field is at least partially prevented from entering the shield structure because of the presence of the HD magnetic layers. Furthermore, including a composite shield structure of the present invention in the trailing shield improves the return field amplitude while maintaining write field amplitude. Meanwhile, employing a HD magnetic layer in one or more of the leading shield and side shields yields a better field gradient and enhanced ADC. In the micromagnetic modeling study, Ms for side shields and leading shield is 16 kG for both designs represented by 62a/62b and 61a/61b. With respect to the FIG. 6a design, the write gap thickness is about 20 nm, hot seed layer thickness (t1) is 70 nm, track width=50 nm, and side gap (g1) thickness is 45 nm.

The present disclosure also encompasses a method of forming a PMR writer having an AWA shield design as depicted in FIG. 4a. Only the process steps from leading shield formation to first trailing shield deposition are described. The remainder of the fabrication sequence comprises conventional steps that are well known in the art and are not described herein.

Figure 8A:
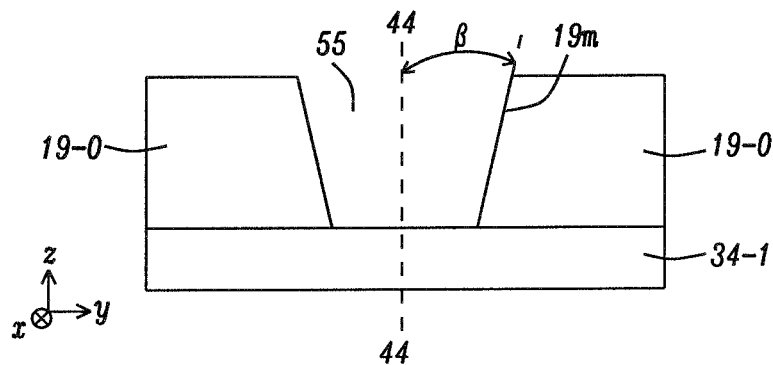

From a cross-sectional perspective at the eventual ABS in FIG. 8a, bottom portion of leading shield layer 34-1 is provided as a substrate. A 10-16 kG magnetic layer 19-0 is plated by a conventional method to form an opening 55 in which the hot seed layers 19h, 34h, HD magnetic layers 19d, 34d, side gap and lead gap layers, and main pole layer will be formed in subsequent steps. Layer 19-0 has sidewall 19m formed with a bevel angle β that is from 0 to about 5 degrees with respect to center plane 44-44.

Figure 8B:
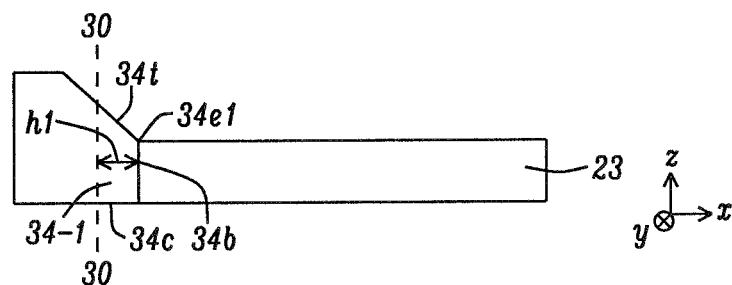
FIGS. 8b, 14b are down-track cross-sectional views depicting the PMR writer structure in FIG. 8a, 14b, respectively.

FIG. 8b is a down-track cross-sectional view along plane 44-44 in FIG. 8a and shows the eventual ABS (plane 30-30) that is determined after a lapping process at the end of the PMR writer fabrication sequence. A photoresist patterning and etching sequence as described in related U.S. Pat. No. 8,749,919 may be used to form a leading shield tapered trailing side 34t on bottom portion 34-1 that intersects the eventual ABS and terminates at a back end 34e1 at back side 34b which is a first height h1 from plane 30-30. The tapered leading side 34t at plane 30-30 is a greater down-track distance than the back end from the leading shield bottom surface 34c.

Figure 9:
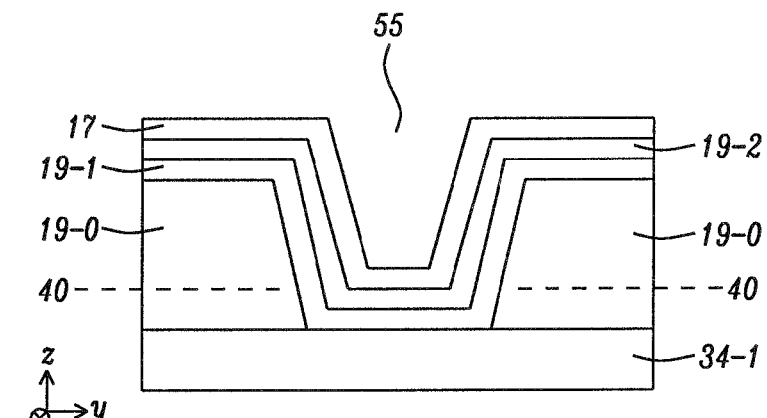

Referring to FIG. 9, HD magnetic layer 19-1 and hot seed layer 19-2 are sequentially deposited by ion beam deposition (IBD) or by a plating technique in opening 55 and preferably form conformal films with thickness w1 and w2, respectively, on leading shield trailing side 34t and on magnetic layer 19-0. When plating is employed to form the shield layers 19-1, 19-2, a photoresist layer (not shown) may be coated and patterned to form an opening that defines the surface onto which the layers 19-1 and 19-2 are deposited. Alternatively, when IBD is used to deposit the HD magnetic layer and hot seed layer in the absence of a photoresist mask, an ion milling process coupled with a photoresist mask is required to remove the unwanted regions of the shield layers that are not within or proximate to opening 55.

Thereafter, gap layer 17 is deposited on hot seed layer 19-2. Plane 40-40 is also shown and is coplanar with a bottom surface of the gap layer. The gap layer is preferably conformal with a thickness of about 20 to 50 nm and becomes the leading gap and side gap layers after subsequent processing. It should be understood that the gap layer may be a composite such as a lower alumina layer contacting the HD magnetic layer, and an upper Ru layer disposed on the alumina layer. Moreover, the portion of magnetic layer 19-0 above plane 40-40 becomes side shield 19s, and the portion of magnetic layer 19-0 below plane 40-40 becomes leading shield 34-2 in the final shield structure shown in FIG. 4a.

Figure 10:
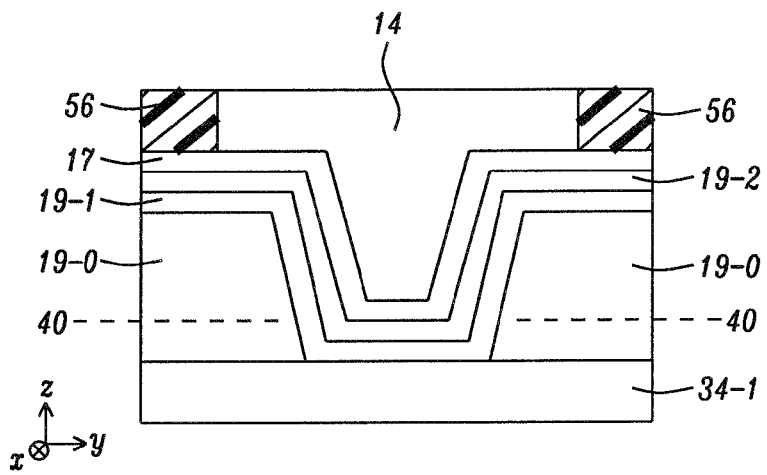

Referring to FIG. 10, a photoresist layer 56 is coated and patterned to form an opening (not shown) having a cross-track width greater than track width TW that exposes opening 55. Then the main pole layer including write pole 14 at the ABS is plated to fill the opening within photoresist layer 56 and also fills opening 55.

Figure 11:
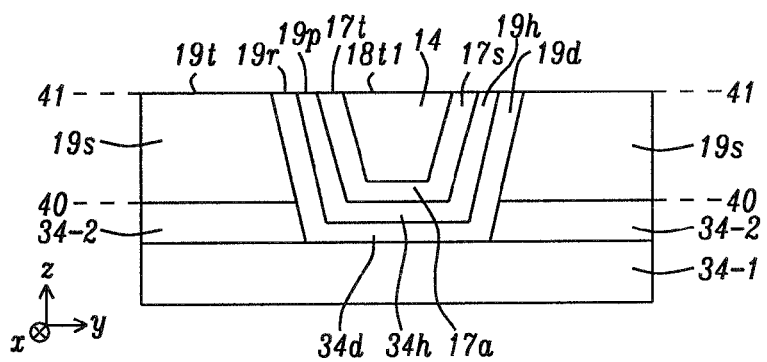

In FIG. 11, a chemical mechanical polish (CMP) process is employed to remove photoresist layer 56 and also the top portions of the main pole, gap layer, and hot seed layer such that a top surface 19t of side shield layers 19s becomes coplanar with a top surface 19r of HD magnetic layer 19d, with top surface 19p of hot seed layer 19h, top surface 17t of side gap 17s, and with main pole trailing side 18t1. Note that side portions of layers 19-1, 19-2 become side shield HD magnetic layers 19d, and side shield hot seed layers 19s, respectively, and bottom portions of layers 19-1, 19-2 become leading shield HD magnetic layer 34d and leading shield hot seed layer 34h, respectively, following the CMP process.

Thereafter, a photoresist layer (not shown) is coated and patterned to form an opening above a front portion of the main pole proximate to the ABS. Ion milling is used to form a taper on trailing side 18t1 and on adjacent composite shield layers such that top surfaces 19r, 19p, 17t intersect plane 41-41 at the ABS. The photoresist layer used to form the pattern for ion milling is then removed by a conventional method.

Figure 12:
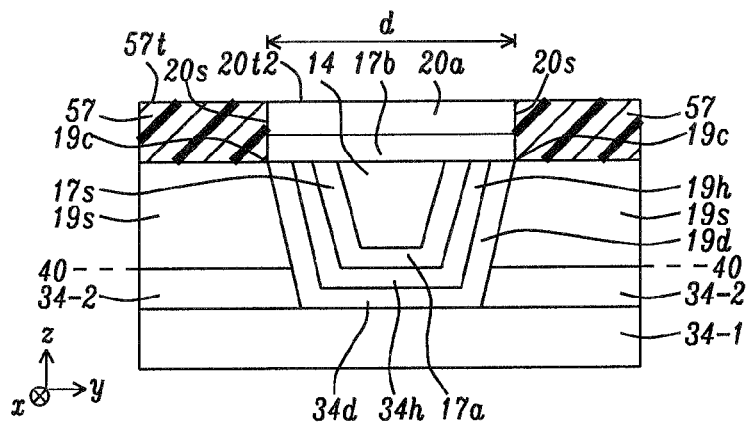

In FIG. 12, the partially formed PMR writer is shown after a photoresist layer 57 is coated and patterned to form an opening having cross-track width d that exposes top surfaces of the main pole, side gaps 17s, HD magnetic layers 19d, hot seed layers 19h, and adjacent regions of side shield layers 19s proximate to the ABS. Write gap layer 17b and first trailing shield hot seed layer 20a are sequentially deposited to fill the opening. A CMP process may be performed to form a planar top surface 20*t*2 on hot seed layer 20*a* that is coplanar with a top surface 57*t* of the photoresist layer.

Figure 13:
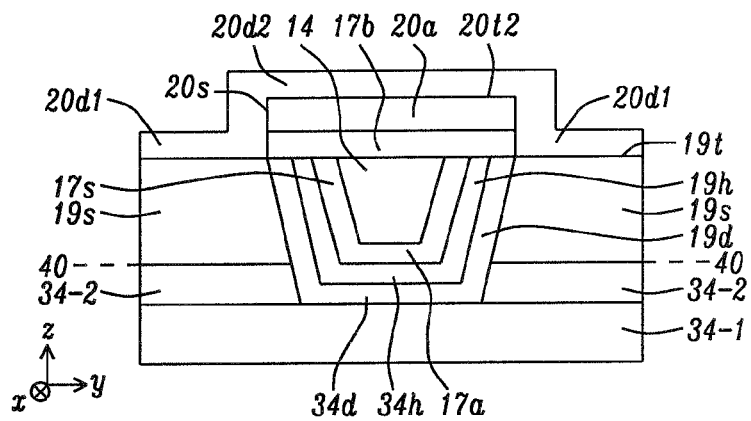

Referring to FIG. 13, photoresist layer 57 is removed by a conventional method and then first trailing shield HD magnetic layer with sections 20*d*1, 20*d*2 is plated to adjoin sides 20*s* of hot seed layer 20*a*, and on top surface 20*t*2, respectively, by a method that is well known to those skilled in the art. As a result, HD magnetic layer section 20*d*1 contacts side surfaces of write gap 17*b*, and the top surface of side shields 19*s* that are adjacent to the write gap. According to one embodiment, the first trailing shield HD magnetic layer is conformal such that a thickness of section 20*d*1 is essentially equal to that of section 20*d*2 in a down-track direction.

Figure 14A:
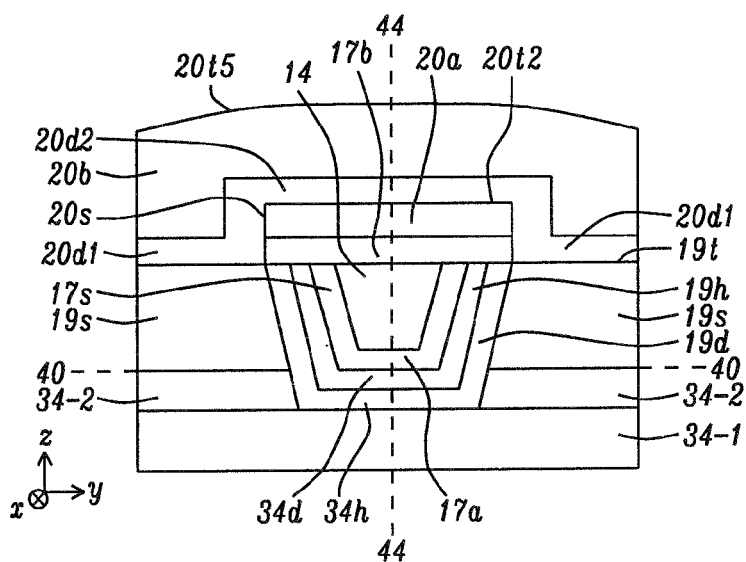

FIG. 14*a* depicts the PMR writer structure in FIG. 13 after the uppermost first trailing shield magnetic layer 20*b* with top surface 20*t*5 is deposited by plating, for example, on top surfaces of HD magnetic layer sections 20*d*1, 20*d*2. As appreciated by those skilled in the art, a CMP process may be employed to form a planar top surface 20*t*4 shown in FIG. 4*a*.

Figure 14B:
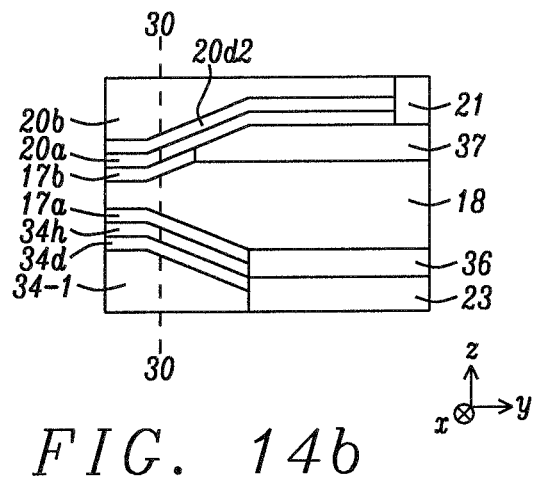

A down-track cross-sectional view is shown in FIG. 14*b* of the partially completed PMR writer structure in FIG. 14*a* along plane 44-44. After the PMR writer is completed in subsequent steps using conventional processing, a lapping process is employed to form the ABS along plane 30-30.

According to another embodiment of the present disclosure, the process sequence of the first embodiment depicted in FIGS. 8*a*-14*b* is modified wherein magnetic layers 19*s*, 34 in the side shields and leading shield, respectively, are replaced by a HD magnetic layer.

Referring to FIG. 15, the shield structure in FIG. 8*a* is modified by replacing leading shield layer 34-1 with a bottom portion 34*db* of the leading shield HD magnetic layer, and forming patterned magnetic layers 19-1 thereon. Magnetic layer 19-1 has sidewall 19*n* formed with bevel angle β of about 0 to 5 degrees with respect to center plane 44-44. Then, magnetic layer 19-2 and the gap layer 17 are sequentially deposited between magnetic layers 19-1 in opening 55. Plane 40-40 is shown and comprises a bottom surface of gap layer 17 as in the previous embodiment. The portion of magnetic layer 19-1 above plane 40-40 becomes side shield layer 19*d*, and the portion of magnetic layer below plane 40-40 becomes the upper portion 34*da* of the leading shield HD magnetic layer in the final shield structure shown in FIG. 5*a*.

Figure 16:
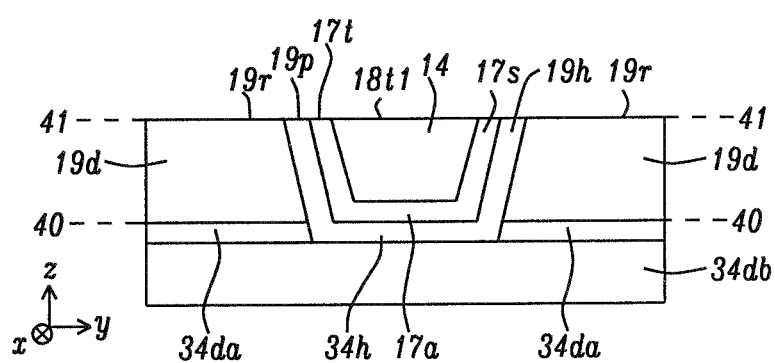

Referring to FIG. 16, the PMR writer in FIG. 15 is shown after forming a photoresist layer 56 and an opening therein to uncover opening 55 similar to the step depicted in FIG. 10. Then, the main pole including write pole 14 is deposited to fill both of the aforementioned openings. A CMP process is performed to remove the photoresist layer and planarize the main pole to give a top surface 18*t*1 that is coplanar with top surfaces 19*r* of HD magnetic layer 19*d*, top surfaces 19*p* of hot seed layers 19*h*, and top surfaces 17*t* of side gaps 17*s*.

At this point, the fabrication steps represented by FIGS. 12-14*b* in the previous embodiment are repeated to form a write gap above the write pole 14, and a composite first trailing shield comprised of a lower hot seed layer 20*a*, middle HD magnetic layer having portions 20*d*1, 20*d*2, and an upper most magnetic layer 20*b* to provide the AWA shield structure as depicted in FIG. 5*a*.

While the present disclosure has been particularly shown and described with reference to, the preferred embodiment thereof, it will be understood by those skilled in the art that various changes in form and details may be made without departing from the spirit and scope of this disclosure.

We claim:

1. A perpendicular magnetic recording (PMR) writer, comprising:
   (a) a main pole with a leading side and a trailing side, the leading side adjoins a lead gap at an air bearing surface (ABS) and the trailing side adjoins a write gap at the ABS;
   (b) a gap layer surrounding the main pole, the gap layer includes the lead gap, the write gap, and a side gap which contacts a side of the main pole formed between the trailing side and leading side on each side of a center plane that bisects the main pole in a direction orthogonal to the ABS; and
   (c) an all wrap around (AWA) shield structure wherein one or more of a leading shield, side shields, and trailing shield have a composite structure, comprising:
   (1) a hot seed layer made of a >19 to 24 kG material having a first side that faces the main pole and adjoins the gap layer, and a second side that is opposite the first side;
   (2) a high damping (HD) magnetic layer made of a 10-16 kG material in the side shields and leading shield, and a 16-19 kG material in the trailing shield, the HD magnetic layer has a Gilbert damping parameter α>0.04 and a first side that adjoins the second side of the hot seed layer, and has a second side that is opposite the first side of the high damping magnetic layer; and
   (3) a magnetic layer made of a 10-16 kG material in the side shields and leading shield, and a 16-19 kG material in the trailing shield with a first side that adjoins the second side of the high damping magnetic layer.

2. The PMR writer of claim 1 wherein the main pole leading side and main pole trailing side each have a tapered portion with a front end at the ABS, the leading side tapered portion extends to a second end that connects with a second main pole leading side aligned orthogonal to the ABS, and the trailing side tapered portion extends to a second end that connects with a second main pole trailing side that is aligned orthogonal to the ABS.

3. The PMR writer of claim 2 wherein the leading shield has the composite structure, and wherein each of the hot seed layer, the high damping magnetic layer, and the 10-16 kG magnetic layer in the leading shield have the first side formed substantially parallel to the leading side tapered portion, and have a back side that is formed at a first height from the ABS.

4. The PMR writer of claim 3 wherein each of the hot seed layer and the high damping magnetic layer in the leading shield are further comprised of a second portion that adjoins the back side of the first portion thereof at the first height and extends orthogonal to the ABS and to a second height greater than the first height.

5. The PMR writer of claim 3 wherein the leading shield HD magnetic layer has a down-track thickness of at least 30 nm, and the leading shield hot seed layer has a down-track thickness of about 20 to 70 nm.

6. The PMR writer of claim 2 wherein the trailing shield has the composite structure, and wherein each of the hot seed layer, the high damping magnetic layer, and the 16-19 kG magnetic layer in the trailing shield have a first portion wherein the first side is formed substantially parallel to the trailing side tapered portion, and have a back side that is formed at a third height from the ABS.

7. The PMR writer of claim 6 wherein each of the hot seed layer and the high damping magnetic layer in the trailing shield are further comprised of a second portion that adjoins the back side of the first portion thereof at the third height and extends orthogonal to the ABS and to a fourth height greater than the third height.

8. The PMR writer of claim 6 wherein the HD magnetic layer in the trailing shield has a thickness from about 30 to 300 nm.

9. The PMR writer of claim 1 wherein each side shield has the composite structure and wherein each of the hot seed layer, the high damping magnetic layer, and the 10-16 kG magnetic layer have the first side formed substantially parallel to a nearest side of the main pole, and have a back side that is formed a first distance from the ABS.

10. The PMR writer of claim 9 wherein the HD magnetic layer in each side shield has a cross-track width of at least 30 nm, and the hot seed layer in each side shield has a cross-track width of about 20 to 70 nm.

11. The PMR writer of claim 1 wherein the high damping magnetic layer is comprised of an alloy that is one of FeNiM, FeCoM, or FeCoNiM wherein M is one of Re, Os, Ir, Rh, Ti, Ta, V, Cr, W, Mn, Mo, Cu, Zr, Nb, Hf, Ru, Pd, Pt, Ag, and Au, and a M content is about 3 to 15 atomic % in the alloy.

12. The PMR writer of claim 1 wherein each side shield has the composite structure and a double tapered design such that a first side thereof facing a write pole portion of the main pole is formed at a first angle $\alpha1$ with respect to the center plane, and a second side of each side shield that faces a flared side of the main pole is formed at a second angle $\alpha2$ with respect to the center plane where $\alpha2>\alpha1$.

* * * * *